United States Patent [19]

White

[11] Patent Number: 4,842,311
[45] Date of Patent: Jun. 27, 1989

[54] SAFETY LATCH

[75] Inventor: Donald L. White, Kent, Ohio

[73] Assignee: Creative Light & Sound Corporation, Twinsburg, Ohio

[21] Appl. No.: 81,033

[22] Filed: Aug. 3, 1987

[51] Int. Cl.$^4$ ............................................. E50C 1/12
[52] U.S. Cl. ........................................ 292/85; 248/408
[58] Field of Search ............................... 248/407–409, 248/354.7, 354.5, 200.1, 188.5; 292/87, 85

[56] References Cited

U.S. PATENT DOCUMENTS

| 387,345 | 8/1988 | Dickson | 248/408 X |
|---|---|---|---|
| 1,009,680 | 11/1911 | Mroczkowski | 248/408 X |
| 1,320,613 | 11/1919 | Gilcrease | 248/408 X |
| 2,152,895 | 4/1939 | Congtin | 248/354.7 X |
| 2,222,078 | 11/1948 | Kroeger et al. | 248/354.5 X |
| 2,681,244 | 6/1954 | Noecker | 292/85 |
| 2,932,481 | 4/1960 | Breer et al. | 248/408 X |
| 4,035,096 | 7/1977 | Miller | 248/408 X |

FOREIGN PATENT DOCUMENTS 521501  5/1940  United Kingdom ............. 248/354.7

Primary Examiner—Alvin C. Chin-Shue
Attorney, Agent, or Firm—Renner, Kenner, Greive, Bobak, Taylor & Weber

[57] ABSTRACT

A safety latch is disclosed which prevents the unintentional telescoping of supporting members of a fixture supporting tripod stand upon failure of its operating cable. The safety latch comprises a spring actuated pawl with an angled lower edge which permits extension of the tripod members while the pawl is engaged, but which prevents telescoping eelapse unless the pawl release is operated, withdrawing the key from supporting engagement between the members.

2 Claims, 2 Drawing Sheets

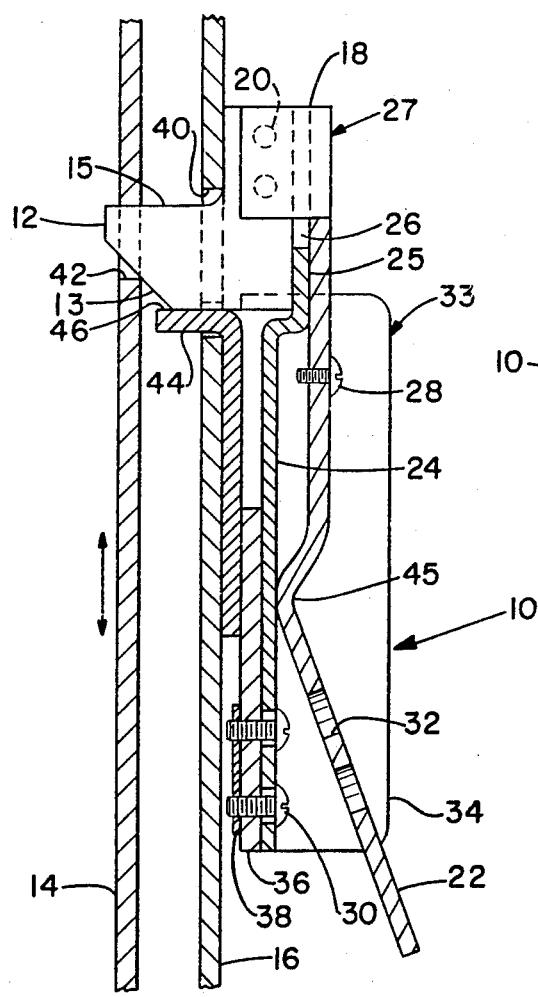
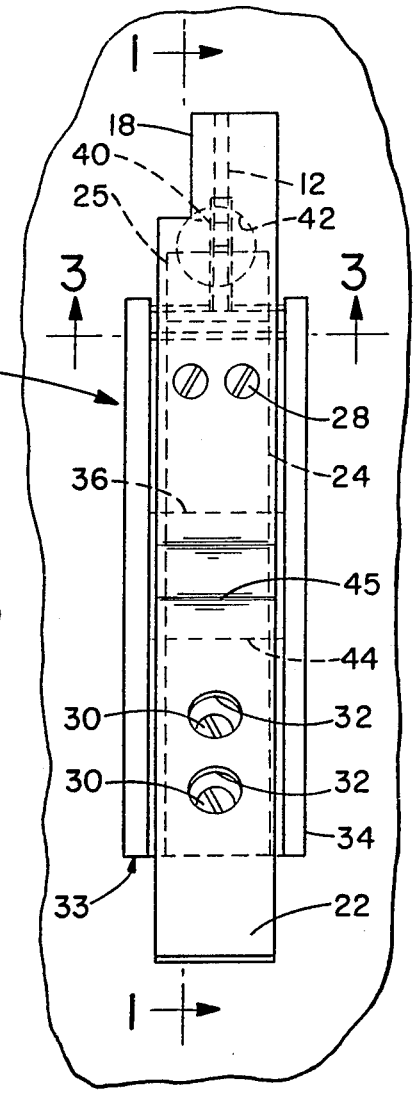
FIG.-1
FIG.-2
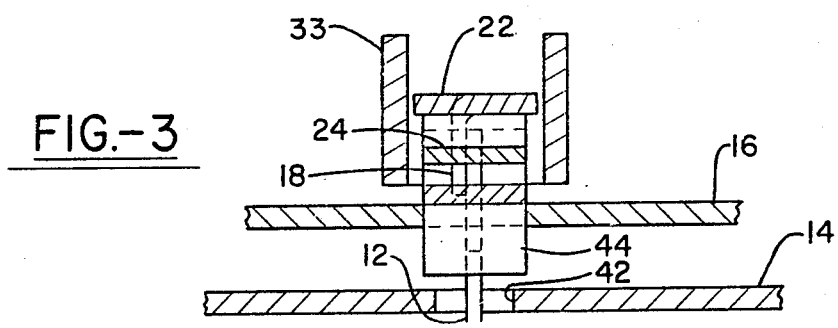
FIG.-3

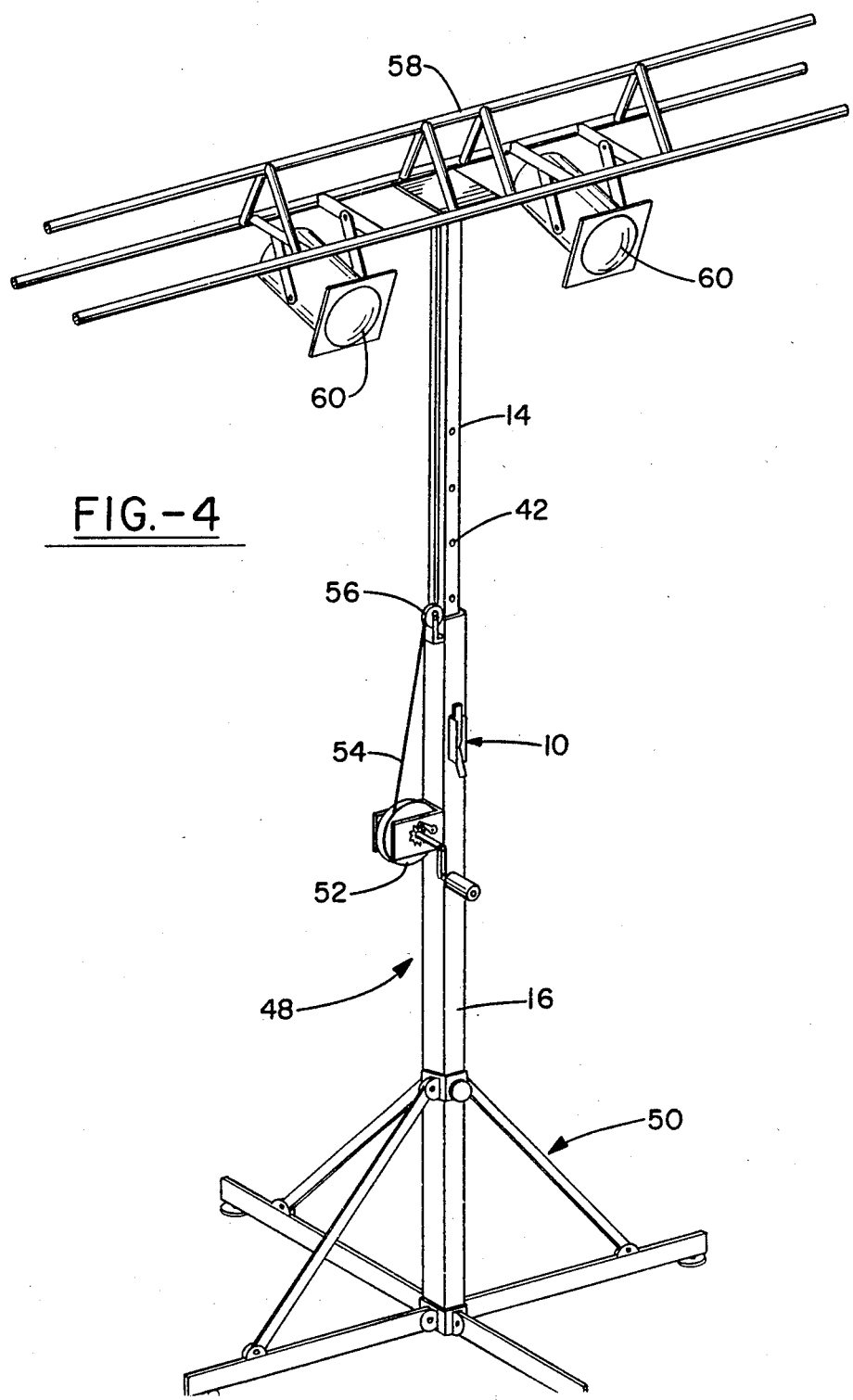

SAFETY LATCH

This invention relates to a safety latch mechanism securably connecting adjacent parts. More particularly, this invention relates to a safety latch mechanism designed to prevent unintended relapsing movement in the telescoping member of an assembly. Specifically, this invention relates to a spring driven locking pawl and its associated components, which arrests unintended downward movement of a vertically telescoping member in an assembly, caused by the structural failure of a part thereof.

BACKGROUND OF THE INVENTION

Those involved in public entertainment such as theatrical production, musical performances, and the like have always depended upon stage lighting, back drops and similar props to produce the effect most conducive to the impression intended to be conveyed. Muscial groups, for instance rock bands, place heavy emphasis on special lighting effects, including flashing lights, to produce novel, psychedelic effects. Such performers often move from location to location, and therefore require light, portable equipment which can readily be transported and set up at the location of a performance.

Frequently, resort is had to lights suspended on horizontal bars or trusses mounted on telescoping tripod stands which can be extended to the desired height by means of an internal cable operated by a hand crank winch. Such systems are not only quite portable, but extremely versatile, inasmuch as the light supporting truss may be raised or lowered as required, and the numbers and types of lights hung therrefrom may be readily varied. The versatility of tripods of the type described has encouraged the use of multiple lighting arrays, some of which weigh as much as 200 to 300 pounds. As a consequence of such heavy loads, it is not uncommon for the tripod stand to experience failure of the operating cable, resulting in the sudden, unintended telescoping relapse of the supporting member carrying the lighting truss into the supporting sleeve of the tripod. The sudden checking of this percipitous downward movement when the supporting member reached the limit of its travel within the supporting sleeve usually dislodges the lighting fixtures, resulting in their destruction. Not only is the result a serious financial loss, but in those instances where the collapse takes place during a show, continuation of the performance is difficult and sometimes impossible.

In the past, an attempt has been made to avoid the problem by inserting pins through adjacent holes provided in the supporting sleeve and the supporting member, preventing relative movement therebetween. While the pins are effective in a static situation, they do not prevent the possibility of an accident when the safety pin has been removed during raising or lowering of the supporting member. At such times, however, particularly during raising of the supporting member, the probability of structural failure is at its highest due to the fact that the cable sometimes catches on an obstruction inside the members, resulting in over-design cable strains which are not detected by the operator due to the heavy weight of the lighting fixtures and the mechanical advantage of the winch. When the ultimate tensile strength of the cable is thus exceeded, it breaks, allowing the sudden drop of the supporting member within the supporting sleeve as previously described.

DISCLOSURE OF THE INVENTION

In light of the foregoing, therefore, a first aspect of the invention is to provide a safety latch which prevents the unintended movement of telescoping members either under static or dynamic conditions.

A second aspect of the invention is the provision of an inexpensive safety latch which avoids the destruction of equipment supported on a tripod stand when part of the stand experiences structural failure.

A further aspect of the invention is to furnish a safety latch which permits the upward movement of a telescoping component, but which prevents the unintended downward movement of the same unless the safety latch is intentionally disengaged.

A still further aspect of this invention is to eliminate the need for safety pins which must be manually inserted through holes in adjacent members, requiring careful alignment thereof.

The foregoing and other aspects of the invention which will become apparent as the detailed description proceeds are achieved by a safety latch for preventing unintended telescoping movement of an inner support member relative to an outer sleeve support member within which the inner support member telescopes, comprising the following components:

a spring operated pawl;

spring means;

pawl engaging means, and pawl release means, wherein the safety latch is mounted on said outer sleeve support member, and said spring means urges the spring operated pawl into pawl engaging means in said inner support member, thereby preventing unintended movement of said inner support member until the pawl is disengaged from said inner support member by activation of said pawl release means.

Other aspects of the invention are attained by a hand winch tripod stand comprising:

a base;

an inner support member;

an outer sleeve support member;

a lighting fixture support bar, and a safety latch, wherein said lighting support fixture bar is attached to the free end of said inner support member, and said inner support membetr is adapted to telescope within said outer sleeve support member which is attached to said base, said inner support member being raised by a cable, one terminus of which is attached to the telescoped end of said inner support member, and the other terminus of which is attached to a winch, and wherein said safety latch comprises:

a spring operated pawl;

spring means;

pawl engaging means, and pawl release means, in which said safety latch is mounted on said outer sleeve support member, and said spring means urges the spring operated pawl into one of a plurality of pawl engaging holes located in said inner support member, said pawl comprising a key having an angular lower edge and a horizontal to edge, whereby said inner support member can be raised by said winch without activating said pawl release means, but said inner support member cannot be lowered without activating said pawl release means, thereby preventing an unintended telescoping of the inner support member in said outer sleeve support member.

BRIEF DESCRIPTION OF THE DRAWINGS

The invention will be better understood when reference is had to the accompanying drawings forming a part hereof in which:

FIG. 1 is a longitudinal cross section of the safety latch device of the invention along line 1—1 of FIG. 2.

FIG. 2 is a front view of the safety latch device of the invention.

FIG. 3 is a transverse cross section of the invention along line 3—3 of FIG. 2.

FIG. 4 is an isometric view of the tripod stand of the invention.

BEST MODE FOR CARRYING OUT THE INVENTION

FIG. 1 shows a longitudinal cross section referring now to the drawings, of the safety latch of the invention along line 1—1 of FIG. 2. As is illustrated by the adjacent arrows, inner support member 14, which supports the truss or bar on which lighting or other fixtures are suspended is adapted to move up or down as required. Pawl 12 is designed as a key having an angular loower edge 13 and a horizontal upper edge 15. This enables inner support member 14 to be raised without the necessity of retracting pawl 12 from support hole 42 in the inner support member, but prevents the inner support from moving downward without such a retraction, due to the interference of the horizontal upper edge 15 of the pawl with the support hole. Pawl 12, which is attached to pawl attachment flange 18 by spot weld points 20 or other fastening means such as rivets, bolts and the like, may be moved out of engagement with support hole 42 by depressing pawl release rocker lever 22. Pawl 12 is urged into support hole 42 by spring clip 24, held in position by spring clip attachment screws 30 extending through guide base 36 into weld nut 38. Alternatively, attachement of spring clip 24 may be accomplished by other fastening methods such as rivets or welding, the number and type of points of attachment being relatively unimportant. The pawl/pawl release rocker lever subassembly 27 is held in position by clip end 25 of spring clip 24, and by lock screws 28. A locking recess 26 is provided in the subassembly 27 between pawl 12 and pawl release rocker lever 22, permitting the subassembly to slide freely over clip end 25. The locking recess 26 and the freedom of movement which it provides to subassembly 27 is a very desirable feature of the invention since it allows subassembly 27 to move downward to support point 46 where pawl 12 can contact pawl support 44, transferring the load carried by inner support member 14 to outer sleeve support member 16. If, for example, spring clip 24 were immovably attached to subassembly 27 and the fit between pawl access slot 40 and the subassembly were not sufficiently precise, the weight of inner support member 14, together with its load, would be transferred directly to spring clip 24, resulting in excessive wear and failure of the spring clip. Subassembly 27, together with spring clip 24, are located in housing assembly 33 which comprises guide walls 34 and guide base 36. Housing assembly 33 confines the movement of pawl release rocker lever 22 to an up-and-down rocker movement at rocker point 45, preventing undesirable lateral movement of the pawl release rocker lever. Housing assembly 33 also provides a means to attach safety latch 10 to outer sleeve support member 16, through intermediate pawl support member 44. Housing assembly 33 may be weled to pawl support member 44, which in turn may be welded to outer sleeve support member 16, or the attachment may be made by means of rivets, bolts, self-tapping screws, or otherwise. Alternatively, housing assembly 33 and pawl support member 44 may be fabricated as an integral unit and then attached to outer sleeve support members 16 as aforesaid.

The dimensions of the safety latch 10 may be varied over a broad range within engineering design principles understood by those skilled in the art. Typically, the overall length of the safety latch will be 4 to 6 inches, and it will have a width of from about $1\frac{1}{2}$ to $2\frac{1}{2}$ inches. The depth of the pawl will depend upon such considerations as the clearance between the inner support member and the outer sleeve support member. However, the depth of the pawl will be such that it extends at least completely through support hole 42. Ordinary steel will commonly be used for the various components of the safety latch 10; however, spring clip 24 will normally be made from tempered steel, while stainless steel is often selected for fabricating pawl 12 since it is tough and long-wearing. The angular lower edge 13 of pawl 12 may be any angle such that the lower edge of a support hole 42 operates to force the pawl out of the hole as the inner support member is raised. Any angle between about 30° to 60° is effective for such purpose.

FIG. 2 illustrates a front view of the safety latch of the invention. The FIG. shows the connecting relationship between pawl 12 and pawl attachment flange 18. Also shown is pawl access slot 40 and a support hole 42, through which pawl 12 extends in a supporting relationship. The position of clip end 25 over pawl 12 is illustrated, as are spring clip attachment screws 30 which hold the spring clip 24 to guide base 36. Shown in the FIG. are clearance holes 32, which prevent interference of pawl release rocker lever 22 with spring clip attachment screws 30 when the rocker lever is depressed between guide walls 34 to withdraw pawl 12 from support hole 42. The magnitude of the angle of pawl release rocker lever 22 at rocker point 45 may also be varied, it only being necessary that the angle be sufficient so that when the rocker lever is depressed, pawl 12 will completely withdraw from support hole 42.

FIG. 3 shows a transverse cross section of the invention along line 3—3 of FIG. 2. The FIG. clearly shows the relationship between pawl attachment flange 18 and pawl 12. It also illustrates how pawl 12 fits into support hole 42, providing support for inner support member 14. While the support hole 42 shown is circular in shape, a different shape such as, for example, square or slotted, would be equally effective. Also shown in FIG. 3 is the penetration of outer sleeve support member 16 by pawl support member 44. Instead of a generally L-shaped pawl support member 44, the pawl support could simply take the form of a projection extending at right angles from an extended guide base 36 of housing assembly 33. In the FIG., the pawl attachment flange 18 extending from pawl release rocker lever 22 is shown to the left of pawl 12. If preferred, pawl attachement flagne 18 could be positioned on the opposite side of pawl 12 without adversely effecting operation of the safety latch.

FIG. 4 is an isometric view of a tripod stand of the invention. As shown, a hand winch tripod 48 comprises a collapsible base 50, an outer sleeve support member 16, and a hand winch 52. The hand winch 52, which includes a locking pawl, not shown, operates to retract a cable 54 extending over a cable pulley 56 and down into outer sleeve support member 16, being attached to the bottom of inner support member 14. Attached to the free end of inner support member 14 is a light bar or truss 58, on which light fixtures 60 are mounted.

To raise the light truss 58, hand winch 52 is turned, retracting operating cable 54, thereby raising inner support member 14 to the telescoped end of which the cable is attached. As the inner support member 14 raises, pawl 12 in the safety latch 10 is forced away from engagement with any support holes 42 which it encounters as a result of the angular lower edge previously described. It is during this operation that the risk of breaking cable 54 is at its greatest, due to the factors mentioned. However, should failure of cable 54 occur during the raising operation, inner support member 14 can only telescope downward until pawl 12 engages the next highest support hole 42, at which point pawl 12 is forced into the hole by spring clip 24 and further downward progress of inner support member 14 is quickly arrested by the blocking contact of horizontal upper edge 15 of the pawl with the edge of the hole. The support holes 42 are located at intervals along inner support member 14, which commonly takes the form of a hollow tube. Typically, support holes 42 are located at intervals from about 3 to 6 inches, and their frequency may vary. For example, the support holes 42 located toward the lower end of the inner support member 14 may be closer together than those toward the top of the inner support member.

To lower the inner support member 14, the pawl release rocker lever 22 is depressed, withdrawing pawl 12 from the support hole 42 in which it is engaged. Hand winch 52 is released from its engaging pawl, and the direction of the hand winch is reversed allowing the cable 54 to unwind therefrom, permitting the inner support member 14 to lower within the outer sleeve support member 16, which may take the form of a hollow tube of slightly greater internal diameter than the external diameter of the inner support member 14, or alternatively, it may be rectangular in shape, as may be the inner support member. In the event of a failure of the cable 54 during the lowering process, the downward movement of the inner support member 14 can be quickly arrested by releasing pawl release rocker lever 22, causing pawl 12 to engage the next adjacent support hole 42 above the pawl.

The hand winch tripods 48 of the type with which the invention is primarily concerned are usually capable of achieving an extended height of from about 9 to 13 feet, although this may vary. In addition to the support of lighting fixtures, they are oftentimes used to support curtains, back drops, scenery, and other objects. Furthermore, quite often several of them are used simultaneously with supporting bars or trusses supported between them.

While in accordance with the patent statutes, a preferred embodiment and best mode has been presented, the scope of the invention is not limited thereto, but rather is measured by the scope of the attached claims.

What is claimed is:

1. A safety latch for preventing unintended telescoping movement of an inner support member relative to an outer sleeve support member within which the inner support member telescopes, comprising:

a spring operated pawl;

spring means;

pawl engaging means; and pawl release means, and wherein said safety latch is mounted on said outer sleeve support member, and said spring means urges said spring operated pawl into one of a plurality of pawl engaging holes located in said inner support member, said pawl comprising a key having an angular lower edge and a horizontal top edge, whereby said inner support member can be raised within said outer support member without activating said pawl release means, but said inner support member cannot be lowered without activating said pawl release means, thereby preventing an unintended telescoping of the inner support member into said outer sleeve support member, and which further comprises a pawl support member having a flange extending horizontally into an interior of said outer support member so as to support said spring operated pawl when said pawl is reached wihtin one of said pawl engaging holes, said pawl being received by said pawl release means and adapted for relative movement with respect thereto, allowing said pawl to contact and be supported by said pawl support said pawl release means comprises a rocker lever attached to said spring operated pawl, the activation of said rocker lever resulting in the disengagement of said pawl from one of said pawl engaging holes, said spring means comprises a flexible strip of metal secured by said fixed outer sleeve support member, and slidingly received within a recess defined by said spring operated pawl opposite said pawl engaging holes and said rocker lever, said strip urging said pawl into one of said holes, and said strip also securing said pawl release means to said safety latch.

2. A safety catch according to claim 1, in which components, other than said pawl engaging means, are held by a housing assembly secured by said outer sleeve support member.

* * * * *